(12) United States Patent
Littecke

(10) Patent No.: US 6,811,580 B1
(45) Date of Patent: Nov. 2, 2004

(54) INSERTS FOR METAL CUTTING PURPOSES

(75) Inventor: Peter Littecke, Huddinge (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/959,723

(22) PCT Filed: May 4, 2000

(86) PCT No.: PCT/SE00/00886

§ 371 (c)(1),
(2), (4) Date: Jan. 7, 2002

(87) PCT Pub. No.: WO00/68457

PCT Pub. Date: Nov. 16, 2000

(30) Foreign Application Priority Data

May 6, 1999 (SE) ............................................... 9901649

(51) Int. Cl.⁷ .......................... B23B 27/14; C23C 16/30
(52) U.S. Cl. ...................... 51/307; 51/309; 427/255.11; 427/255.23; 427/255.32; 427/255.351; 428/216; 428/336; 428/698; 428/699; 428/704
(58) Field of Search ................................ 428/216, 336, 428/698, 699, 704, 701; 51/307, 309; 427/255.11, 255.23, 255.32, 255.391, 255

(56) References Cited

U.S. PATENT DOCUMENTS 5,326,380 A   7/1994 Yao et al.
5,861,210 A   1/1999 Lenander et al.
5,879,823 A * 3/1999 Prizzi et al.

FOREIGN PATENT DOCUMENTS

| EP | 102843 | | 3/1984 |
| EP | 701982 | | 3/1996 |
| EP | 714719 | | 6/1996 |
| JP | 07-018415 | * | 1/1995 |
| JP | 7024606 | | 5/1995 |
| JP | 08-323506 | * | 12/1996 |
| JP | 10-245287 | * | 9/1998 |
| WO | 98/28464 | | 7/1998 |

* cited by examiner

Primary Examiner—Archene Turner
(74) Attorney, Agent, or Firm—Burns, Doane, Swecker & Mathis, L.L.P.

(57) ABSTRACT

The present invention relates to a cutting tool with increased tool life when machining grey cast iron. The tool comprises a solid CBN-containing body containing more than 60 vol % CBN and a coating. The coating consists of at least one layer of metal nitride, carbonitride or carbide with the metal elements selected from at least one of Ti, Nb, Hf, V, Ta, Mo, Zr, Cr, W and Al, with a total thickness of 2–7 $\mu$m and 2–8 $\mu$m of $\alpha$- and/or $\kappa$-$Al_2O_3$. The coating is a CVD coating deposited at 900° C. or higher.

8 Claims, No Drawings

INSERTS FOR METAL CUTTING PURPOSES

This application is a national stage application of PCT/SE00/00886 under 35 U.S.C. §371, filed May 4, 2000, that designated the United States of America, and which claims priority to Swedish Application No. 9901649-5, filed on May 6, 1999, and which PCT application was published in English on Nov. 16, 2000.

FIELD OF THE INVENTION

The present invention relates to a cutting tool with increased tool life when machining grey cast iron.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Cutting tools having cutting edges formed of a superhard abrasive such as a cubic boron nitride (CBN) based material are manufactured by powder metallurgical techniques and are to an increasing extent used for the machining of cast iron and hardened steel. Several types of CBN cutting tools are known, the majority consisting of a CBN tip that has been brazed onto a cemented carbide insert. Others have the CBN sintered directly to a cemented carbide backing of sufficient thickness to produce an insert while yet others consist of mainly CBN without any cemented carbide backing.

Subjecting an insert with a brazed on CBN/cemented carbide tip to temperatures over 700° C. will result in destroying the braze, but for inserts without any braze joint there is no such limitation.

When machining hardened steels, e.g., ball bearing steels, chemical dissolution of the tool material is an important part of the wear mechanism, provided that the tool material has sufficient hot hardness to resist plastic deformation. For that reason the CBN materials used for such work materials usually contain a high fraction of secondary phases with low chemical solubility in steel. In WO 98/28464 it is shown in the example that applying a coating including a MTCVD-TiCN and a CVD-$Al_2O_3$-layer to such a low CBN tool material, substantial advantages in tool life can be achieved when machining hardened ball bearing steel. The CVD-coating is applied to a substrate comprising cemented carbide and at least one CBN body whereby the cemented carbide constitutes the main part of the substrate.

When machining grey cast iron, the dominating wear mechanism is of abrasive nature, and consequently due to the high hardness of CBN, the most suitable material for grey cast iron is that of high CBN content, generally more than 60%, often over 80%. An example of such a material is disclosed in U.S. Pat. No. 5,326,380. Inserts of this type are usually produced as a layer of CBN-containing material bonded through sintering to a cemented carbide backing, or a solid CBN-compact thus having no braze joint on the finished insert that can be damaged at normal CVD coating temperatures.

SUMMARY OF THE INVENTION

The tool comprises a CBN-containing body with more than 60 vol % CBN and a coating. The coating consists of at least one layer of metal nitride, carbonitride or carbide with the metal elements selected from at least one of Ti, Nb, Hf, V, Ta, Mo, Zr, Cr, W and Al and at least one layer of $Al_2O_3$. The coating is a CVD coating deposited at 900° C. or higher.

DETAILED DESCRIPTION OF THE INVENTION

Now it has been found that applying a CVD-coating to such an insert made from high CBN-content material will also increase the performance leading to increased tool life when machining grey cast iron.

In one preferred embodiment the insert is of solid CBN i.e. without cemented carbide support.

In another preferred embodiment the insert is provided with a central hole for clamping.

In a most preferred embodiment the insert is of solid CBN with a central hole for clamping. This central hole is made by laser machining.

The coating can consist of at least one layer of a metal carbide, nitride and/or carbonitride with the metal element selected from at least one of Ti, Nb, Hf, V, Ta, Mo, Zr, Cr, W and Al, preferably TiC, TiCN, TiN or TiAlN plus at least one layer of $Al_2O_3$. The $Al_2O_3$-layer can be α and/or κ phase. The total coating thickness of the nitride, carbonitride or carbide layer can be 2–7 μm, preferably 3–5 μm, and the total thickness of $Al_2O_3$ can be 2–8 μm with a preferred thickness of 4–7 μm.

The total coating thickness according to the invention varies between 4 and 15 μm, preferably between 5 and 10 μm.

The number and thickness of individual coatings can be varied, but the total accumulated thickness of the individual coatings falls within the limitations stated above.

A further improvement in cutting performance can be anticipated if the edges of the $Al_2O_3$ coated cutting tools according to the invention are treated by a gentle wetblasting process or by edge brushing with brushes based on e.g. SiC as disclosed in U.S. Pat. No. 5,861,210.

EXAMPLE

A Sandvik CBN insert SNGN 120408F in grade CB50 containing about 90% CBN by volume was coated with a 4 μm inner layer of TICN and it 6 μm outer layer of α-$Al_2O_3$ using CVD-technique at a temperature of about 1000° C.

It was then used to machine workpieces of pearlitic grey cast iron (Swedish standard SS0125) at a cutting speed of 500 m/min using a feed rate of 0.3 nm/rev and a depth of cut of 0.5 mm. The table below shows flank wear in mm versus time in cut under dry cutting conditions. An uncoated CBN of the same composition was used as a reference.

|  | Number of passes | | | | | | |
| --- | --- | --- | --- | --- | --- | --- | --- |
| Variant | 4 | 8 | 12 | 16 | 20 | 24 | 28 |
| Uncoated reference | 0.09 | 0.11 | 0.21 | 0.26 | 0.30 | 0.34 | 0.35 |
| Present invention | 0.05 | 0.07 | 0.09 | 0.09 | 0.10 | 0.12 | 0.13 |

While the present invention has been described by reference to the above-mentioned embodiments, certain modifications and variations will be evident to those of ordinary skill in the art. Therefore, the present invention is to limited only by the scope and spirit of the appended claims.

What is claimed is:

1. A cutting tool for the machining of grey cast iron comprising:
   a CBN-substrate comprising more than 60 vol % CBN; and
   a CVD coating deposited at 1000° C. or higher comprising at least one layer of metal nitride, carbonitride or carbide with the metal elements selected from the group consisting of Ti, Nb, Hf, V, Ta, Mo, Zr, Cr, W and Al and at least one layer of α and/or κ-Al$_2$O$_3$, and
   wherein a total thickness of the at least one layer of metal nitride, carbonitride or carbide is 2–7 μm and a total thickness of the at least one layer of α- and/or κ-Al$_2$O$_3$ is 2–8 μm.

2. The cutting tool according to claim 1, wherein the cutting tool has a central clamping hole.

3. The cutting tool according to claim 1, wherein the substrate has a backing that is cemented carbide free.

4. The cutting tool according to claim 1, wherein the total thickness of the at least one layer of metal nitride, carbonitride or carbide is 3–5 μm.

5. The cutting tool according to claim 1, wherein the at least one layer of metal nitride, carbonitride or carbide is a layer of TiC, TiCN, TiN or TiAlN.

6. The cutting tool according to claim 1, wherein the total thickness of the at least one layer of α- and/or κ-Al$_2$O$_3$ is 4–7 μm.

7. The cutting tool according to claim 1, wherein the substrate comprises at least approximately 90 volume % CBN.

8. A method of machining a grey cast iron, comprising:
   providing a cutting tool comprising a solid CBN-substrate comprising more than 60% by volume CBN and a CVD coating deposited by CVD at a temperature of 1000° C. or higher, said coating comprising at least one layer of metal nitride, carbonitride or carbide having at least one metal element selected from the group consisting of Ti, Nb, Hf, V, Ta, Mo, Zr, Cr, W and Al, and at least one layer of α- and/or κ-Al$_2$O$_3$, wherein a total thickness of the at least one layer of metal nitride, carbonitride or carbide is 2–7 μm and a total thickness of the at least one layer of α- and/or κ-Al$_2$O$_3$ is 2–8 μm; and
   machining the grey cast iron with the cutting tool.

* * * * *